UNITED STATES PATENT OFFICE.

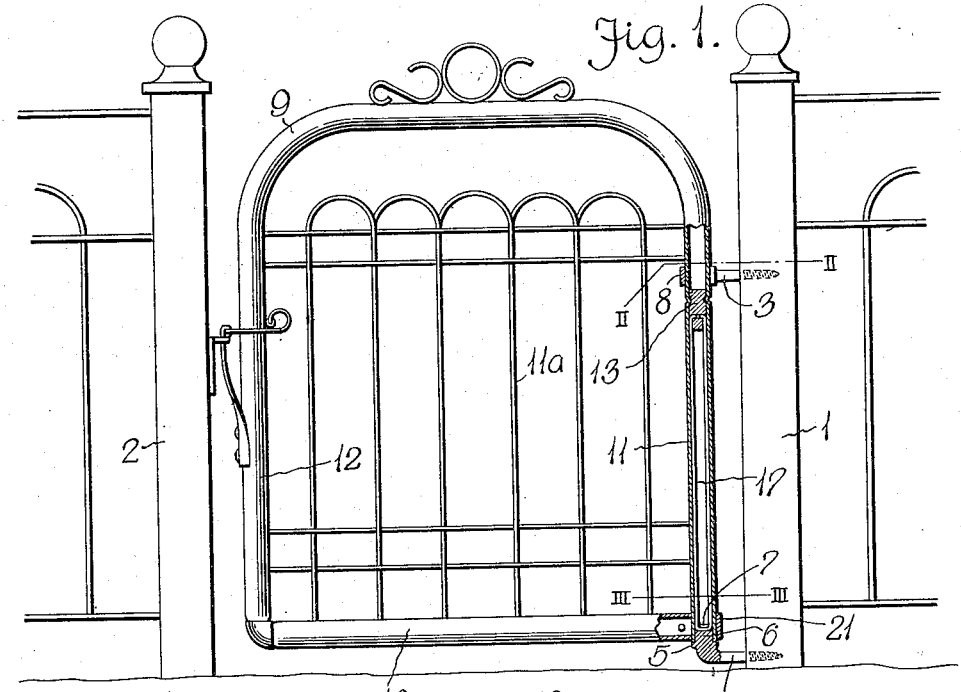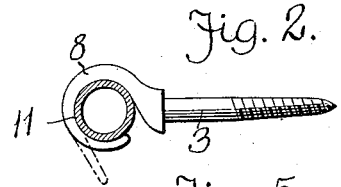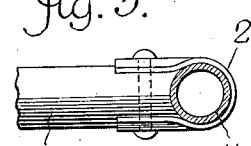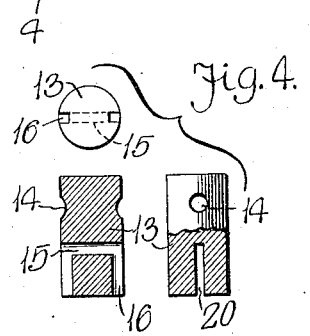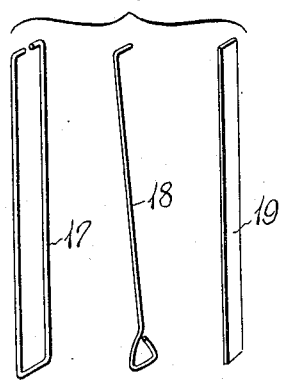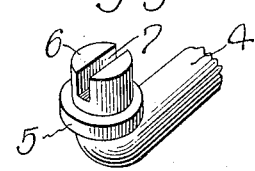

JOHN S. BARNES, OF DETROIT, MICHIGAN.

CLOSING MEANS FOR FENCE-GATES.

1,173,408.   Specification of Letters Patent.   Patented Feb. 29, 1916.

Application filed October 23, 1915.   Serial No. 57,609.

*To all whom it may concern:*

Be it known that I, JOHN S. BARNES, a citizen of the United States of America, residing at Detroit, in the county of Wayne and State of Michigan, have invented certain new and useful Improvements in Closing Means for Fence-Gates, of which the following is a specification, reference being had therein to the accompanying drawings.

Figure 1 illustrates, by the way of an example, a lawn gate in accordance with my invention; Fig. 2 is an enlarged horizontal sectional view taken on the line II—II of of Fig. 1, illustrating a gate hanger or bearing; Fig. 3 is a horizontal sectional view taken on the line III—III of Fig. 1, showing a portion of the gate frame; Fig. 4 illustrates in plan and section a frame block or spring holder; Fig. 5 illustrates in perspective different types of springs that may be utilized as a gate closing means; and Fig. 6 is a perspective view of a gate hanger or bearing.

In the drawings, 1 and 2 denote suitable posts forming part of a fence and providing a gateway or passage adapted to be normally closed by a gate or movable barrier.

The post 1 is provided with hangers or bearings 3 and 4 suitably connected to the post. The bearing 4 is located in proximity to the ground and has a collar 5 and a stud 6, said stud being slotted or bifurcated, as at 7. The hanger or bearing 3 has a malleable hook 8 in vertical alinement with the stud 6 and these two hangers or bearings coöperate in supporting a gate, which as a matter of good construction, is composed of an inverted U-shaped tubular frame 9 and a tubular bottom rail 10, said frame and rail supporting a suitable panel or filler 11ª. The frame 9 provides a pivot rail 11 and a latch rail 12, said pivot rail having the end thereof open to receive the stud 6, whereby the pivot rail may be swung upon the collar 5 when loosely embraced by the malleable hook 8, as best shown in Fig. 2.

In the pivot rail 11 of the gate frame 9 is located concealed gate closing means, comprising a block or spring holder 13 placed in said pivot rail contiguous to the hanger or bearing 3. The block or spring holder has recesses 14 and by denting or upsetting the walls of the pivot rail 11, said block or spring holder can be firmly anchored within the tubular pivot rail. The lower end of the block or spring holder has a transverse opening 15 and grooves 16 communicating with said opening. The opening 15 and the grooves 16 accommodate the upper end of a spring designated 17, shown in Fig. 5, said spring being in the form of an oblong link adapted to have the lower end thereof seated in the slot or bifurcation 7 of the stud 6, said spring extending longitudinally of the tubular pivot rail 11 and constituting means for closing the gate or restoring the same to normal position after having been swung in either direction. In lieu of this spring a single rod 18 may be used, said rod having the upper end thereof bent to engage in the opening 15 of the spring holder 13 and the lower end thereof shaped to engage in the slot or bifurcation 7. It is also possible to use a flat spring 19 by providing the block or spring holder 13 with a slot or bifurcation 20 similar to the slot or bifurcation 7 of the stud 6. One end of the rail 10 can be connected to the lower end of the pivot rail 11 by a strap 21 embracing said rail, and the opposite end of the bottom rail 10 can be connected to the latch rail 12 of the gate frame in any suitable manner.

From the foregoing it will be observed that I have devised a novel metallic lawn and driveway gate wherein the automatic closing means is concealed. Ordinarily an exposed spring is employed for closing a gate and when so exposed it is susceptible to crystallization or deterioration by the forces of nature and there is liability of clothes being torn and the fingers of children pinched. Such is avoided by my improved concealed closing means, and by having both ends of the spring anchored it can be flexed or twisted in either direction without danger of displacement. Expansion and contraction does not effect the operation of the gate. When made of galvanized metal or a non-corrodible material rust is avoided and the gate is practically indestructible for the purposes for which it is intended.

What I claim is:—

1. The combination with bearings, of a gate having a pivot rail supported by said bearings, and closing means for said gate concealed in the rail thereof.

2. The combination with bearings, of a gate having a pivot rail supported by said bearings, and a spring held by one of said bearings within said rail adapted to maintain said gate normally closed.

3. The combination with bearings, of a gate having a pivot rail supported by said bearings, and closing means fixed relative to said rail and anchored relative to one of said bearings adapted to maintain said gate normally closed.

4. The combination with bearings, of a gate having a pivot rail rotatable relative to said bearings, a block mounted in the rail of said gate adjacent to one bearing, and closing means held by said block and engaging the other bearings to maintain said gate normally closed.

5. A gate adapted to be hung to swing in either direction, comprising a tubular frame, and means concealed in said frame adapted to maintain said gate normally closed.

6. A gate adapted to be hung to swing in either direction, comprising a tubular frame, and means within said gate frame flexed by swinging said gate adapted to restore said gate to normal position.

7. A gate adapted to be hung to swing in either direction, comprising a frame having a hollow pivot rail, and means within said hollow pivot rail flexed by swinging said gate adapted to restore said gate to normal position.

In testimony whereof I affix my signature in presence of two witnesses.

JOHN S. BARNES.

Witnesses:
OTTO F. BARTHEL,
ANNA M. DORR.

Copies of this patent may be obtained for five cents each, by addressing the "Commissioner of Patents, Washington, D. C."